(12) United States Patent
Wang et al.

(10) Patent No.: US 7,158,515 B1
(45) Date of Patent: Jan. 2, 2007

(54) METHOD OF OPTICAL NETWORK BANDWIDTH REPRESENTATION FOR OPTICAL LABEL SWITCHING NETWORKS

(75) Inventors: Guo-Qiang Wang, Nepean (CA); Yanhe Fan, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 700 days.

(21) Appl. No.: 09/611,447

(22) Filed: Jul. 6, 2000

(51) Int. Cl.
 *H04L 12/56* (2006.01)
 *H04J 14/00* (2006.01)

(52) U.S. Cl. .................. 370/392; 370/469; 398/51

(58) Field of Classification Search .......... 370/389, 370/392, 400–405, 395.5, 469; 398/45–48, 398/51
See application file for complete search history.

(56) References Cited

U.S. PATENT DOCUMENTS

| | | | |
|---|---|---|---|
| 4,995,032 A * | 2/1991 | Demichelis et al. ........ 370/230 |
| 6,111,673 A * | 8/2000 | Chang et al. .................. 398/79 |
| 6,175,870 B1 * | 1/2001 | Gawlick et al. ............. 709/227 |
| 6,233,075 B1 * | 5/2001 | Chang et al. .................. 398/79 |
| 6,356,544 B1 * | 3/2002 | O'Connor ................... 370/353 |
| 6,363,319 B1 * | 3/2002 | Hsu ............................ 701/202 |
| 6,501,756 B1 * | 12/2002 | Katsube et al. ............. 370/392 |
| 6,526,056 B1 * | 2/2003 | Rekhter et al. ............. 370/392 |
| 6,532,088 B1 * | 3/2003 | Dantu et al. ................... 398/43 |
| 6,577,418 B1 * | 6/2003 | Boivie ......................... 398/48 |
| 6,600,583 B1 * | 7/2003 | Fatehi et al. ................. 398/82 |
| 6,657,757 B1 * | 12/2003 | Chang et al. ............... 370/471 |
| 6,738,354 B1 * | 5/2004 | Ashwood Smith .......... 370/248 |

FOREIGN PATENT DOCUMENTS

EP      1069742 A2 *   1/2001

OTHER PUBLICATIONS

Fan et al. "Extensions to CR-LDP and RSVP-TE for Optical Path Setup". draft-fan-mpls-lambda-signaling-00.txt. Mar. 2000. pp. 1-26.*
Wang et al. "Extensions to OSPF/IS-IS for Optical Routing". draft-wang-ospf-isis-lambda-te-routing-00.txt. Mar. 2000. pp. 1-1.*
Saha et al. "RSVP Extenstions for Signaling Optical Paths". draft-saha-rsvp-optical-signaling-00.txt. Mar. 2000. pp. 1-8.*
Tang et al. "Extensions to CR-LDP for Path Establishment in Optical Networks". draft-tang-crldp-optical-00.txt. Mar. 2000. pp. 1-7.*
"User Network Interface (UNI) 1.0 Signaling Specification," The Optical Networking Forum, Fremont, CA. Dec. 8, 2000. pp. 1-106.*

(Continued)

*Primary Examiner*—Ricky Q. Ngo
*Assistant Examiner*—Donald L Mills
(74) *Attorney, Agent, or Firm*—Jeffrey M. Measures; Borden Ladner Gervais LLP

(57) ABSTRACT

This present invention provides generic and flexible methods to represent optical bandwidth and service interfaces for optical label switching networks. Most importantly, bandwidth may be represented simply at various granularity levels and in various combinations. This simplicity will greatly help in design and implementation of protocols for use in optical label switching networks.

16 Claims, 13 Drawing Sheets

OTHER PUBLICATIONS

R. Callon, et al., "A Framework for Multiprotocol Label Switching", Sep. 1999, Work in Progress, pp. 1-85, <draft-ietf-mpls-framework-05,txt>.

E. Rosen, et al., "Multiprotocol Label Switching Architecture", Aug. 1999, Work in Progress, pp. 1-80, <draft-ietf-mpls-arch-06.txt>.

Loa Andersson, et al., "LDP Specification, Internet Engineering Task Force (IETF), Internet Draft", Oct. 1999, pp. 1-149, <draft-ietf-mpls-ldp-06.txt>.

Bilel Jamoussi, "Constraint-Based LSP Setup Using LDP", Sep. 1999, pp. 1-51. <draft-ietf-mpls-cr-ldp-03.txt>.

Awduche, et al. "RSVP-TE: Extensions to RSVP for LSP Tunnels", Feb. 2000, pp. 1-63, <draft-ietf-mpls-rsvp-lsp-tunnel-05.txt>.

* cited by examiner

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| U | F | \multicolumn{16}{c}{TYPE} | | | | | | | | | | | | | | | \multicolumn{14}{c}{LENGTH} | | | | | | | | | | | | | | |
| \multicolumn{32}{c}{VALUE} | | | | | | | | | | | | | | | | | | | | | | | | | | | | | | |

| 0 | | | | | | | | | | | 1 | | | | | | | | | | | 2 | | | | | | | | | | | 3 | |
|---|---|---|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| CHANNEL GROUP TYPE | | | | | | | | | | | | | | | | NUMBER OF GROUP MEMBERS | | | | | | | | | | | | | | | |
| LINE RATE ENCODING TYPE | | | | | | | | | | | | | | | | LENGTH | | | | | | | | | | | | | | | |
| BANDWIDTH VECTOR MASK | | | | | | | | | | | | | | | | | | | | | | | | | | | | | | | |

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| FIBER ID | | | | | | | | | | | | | | | | LAMBDA ID | | | | | | | | | | | | | | | |

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| FIBER ID | | | | | | | | | | | | | | | | LAMBDA ID | | | | | | | | | | | | | | | |
| CHANNEL ID | | | | | | | | | | | | | | | | | | | | | | | | | | | | | | | |

FIG. 6B

| 0 | | 1 | 2 | 3 |
|---|---|---|---|---|
| 0 1 2 3 4 5 6 7 | U 1 | 8 9 0 1 2 3 4 5 | TYPE = OPTICAL INTERFACE TYPE | 6 7 8 9 0 1 2 3 4 5 6 7 8 9 0 1 LENGTH |
| VALUE = LINK ATTRIBUTE TLV ||||

| 0 | 1 | 2 | 3 |
|---|---|---|---|
| 0 1 2 3 4 5 6 7 8 9 0 1 2 3 4 5 | 6 7 8 9 0 1 2 3 4 5 | 6 7 8 9 0 1 2 3 4 5 6 7 8 9 0 1 | |
| TYPE = OPTICAL LABEL RANGE COMPONENT LIST | LENGTH | | |
| M | N | RESERVED | |
| VALUE = OPTICAL LABEL RANGE COMPONENT 1 ||||
| VALUE = OPTICAL LABEL RANGE COMPONENT 2 ||||
| ... ||||
| VALUE = OPTICAL LABEL RANGE COMPONENT N ||||

METHOD OF OPTICAL NETWORK BANDWIDTH REPRESENTATION FOR OPTICAL LABEL SWITCHING NETWORKS

FIELD OF THE INVENTION

The present invention relates to data communication networks and, more particularly, to optical label switching networks and, further, to a method of optical network bandwidth representation for such networks.

BACKGROUND OF THE INVENTION

A network is typically represented as a set of nodes and links between the nodes. In networking for data communication, a protocol may be chosen for the communication of a traffic flow from a source node to a destination node based on such factors as a Quality of Service (QoS) requirement of the traffic flow and information known about the links in the path from the source to the destination. A network may be defined in part by the manner in which it determines a route from source to destination (routing) and the manner in which multiple traffic flows share individual links along the route (multiplexing).

Increasing requirements for capacity in data networks is, to a large extent, being met by communication links over which communication is accomplished by modulating an optical signal, such as a beam of light, to represent binary coded data. Such networks are called optical networks. One of the strengths of optical networks is found in long distance communication. As such, two geographically separated service networks that use electrical links may be connected through the use of an optical network. An optical network used for this purpose may be called a transport network and will often use a communication protocol different than that in use in the service networks.

To make efficient use of an optical medium (such as glass fiber), many unique data signals may be transmitted over the same fiber so long as each data signal modulates an optical signal with a wavelength different from the other optical signals on the same fiber. When the wavelengths of the different optical signals are only marginally different from one another, the transmission scheme may be called Dense Wavelength Division Multiplexing (DWDM). In a network using DWDM, two elements connected by a single fiber may communicate using a number of optical signals, each with a distinct wavelength. Each optical signal (at a single wavelength) may be called a "Lambda" and be described in terms normally associated with an entire link between elements, such as bandwidth and delay.

Time division multiplexing (TDM) is another way of transmitting several data signals over a single link. In TDM schemes, streams of digital data are broken up into segments, for instance "octets" which are sequences of eight bits, which may also be called bytes. The North American standard for digital networks that employ optical fiber is called Synchronous Optical Network (SONET). The European and ITU-T (Telecommunication Standardization Sector of the International Telecommunications Union) standard is called Synchronous Digital Hierarchy (SDH). Both use octet multiplexing to create a higher-speed stream from several lower-speed tributary signals. In octet multiplexing, successive time slots on a carrier signal are allocated to octets from different tributaries. In a SONET based transmission system, the multiplexed output of a node may be a "Synchronous Transport Signal Level 1 (STS-1)" frame with a basic bit rate of 51.84 Mbps. When such a frame is transmitted on an Optical Carrier, it is said to be an Optical Carrier Level 1 signal, or OC-1. Along a path from a source to a destination, STS-1 frames may be multiplexed together into a higher order frame, such as an STS-3 frame carried on an OC-3 signal. An OC-3 signal is said to have three STS-1 time slots.

The multiplexing methods above may be used alone or in combination. When used in combination, a single fiber between two nodes may, for example, carry a first Lambda which is an OC-3 signal carrying three STS-1 time slots and a second Lambda which is an OC-48 signal carrying four OC-12 signals, each carrying three OC-3 signals which each carry three STS-1 time slots, for a total on the second Lambda of 48 STS-1 time slots.

Various routing schemes have been developed for determining an optimum path from source to destination. In particular, Open Shortest Path First (OSPF) is a routing scheme which involves including an indication of the address of a source and destination of an OSPF protocol data unit (PDU) within the PDU. Each node, in a given network using OSPF, maintains an identical database describing the topology of the given network, i.e., which nodes have links to which other nodes and the state and qualities of those links. From information in the topology database, a routing table may be calculated. A routing table stores a "shortest" path from each node to each other node. Upon receiving an OSPF PDU, a node may extract the address of the destination node of the PDU. The node then consults the routing table to determine the next node in the shortest path to the destination node, determines the identity of the link to the next node and transmits the OSPF PDU to the determined next node over the identified link.

Multi-Protocol Label Switching (MPLS) is a technology for speeding up network traffic flow and increasing the ease with which network traffic flow is managed. As in OSPF, each node maintains an identical database describing the topology of the given network. Prior to sending an MPLS PDU, the source node uses the topology database to predetermine a path to the destination node. The nodes along the predetermined path are then informed of the next node in the path through messages sent by the source node to each node in the predetermined path, where each node uses information contained in the received message to associate a "label" with a mapping of an ingress connection from the previous node to an egress connection to the next node. By including, at the source node, the label in each MPLS PDU sent to the destination node, the time that would be otherwise needed for a node to determine the next node to which to forward a PDU is saved. The path arranged in this way is called a Label Switched Path (LSP). MPLS is called multiprotocol because it works with the Internet Protocol (IP), Asynchronous Transport Mode (ATM) and frame relay network protocols. An overview of Multi Protocol Label Switching (MPLS) is provided in R. Callon, et al, "A Framework for Multiprotocol Label Switching", Work in Progress, November 1997, and a proposed architecture is provided in E. Rosen, et al, "Multiprotocol Label Switching Architecture", Work in Progress, July 1998, both of which are hereby incorporated herein by reference.

A fundamental concept of MPLS is that two Label Switching Routers (LSRs) must agree on the meaning of the labels used to forward traffic between and through each other. This common understanding is achieved by using a set of procedures, called a label distribution protocol, by which one LSR informs another of label bindings it has made. The MPLS architecture does not assume a specific label distribution protocol.

Label distribution protocols that have been proposed include LDP (Label Distribution Protocol) and a constraint-based extension to LDP called CR-LDP. Further label distribution protocols include RSVP (Resource ReSerVation Protocol) and an extension to RSVP called RSVP-TE. LDP is described in detail in Loa Andersson, et al., LDP Specification, Internet Engineering Task Force (IETF), Internet Draft, draft-ietf-mpls-ldp-06.txt, October 1999 which is hereby incorporated herein by reference and referred to hereafter as "the LDP specification". Constraint-Based Routing (CR) offers the opportunity to extend the information used to set up paths beyond what is available for the routing protocol. For instance, an LSP can be set up based on explicit route constraints, QoS constraints, etc. CR-LDP, as defined in Bilel Jamoussi, "Constraint-Based LSP Setup using LDP," draft-ietf-mpls-cr-ldp-03.txt, Work in progress, September 1999, and hereby incorporated herein by reference, specifies mechanisms and parameters for support of CR-LSPs using LDP. RSVP-TE is described in detail in Awduche, et al, "RSVP-TE: Extensions to RSVP for LSR Tunnels," draft-ietf-mpls-rsvp-lsp-tunnel-05.txt, Work in progress, September 1999, which is also hereby incorporated herein by reference and specifies extensions to RSVP for establishing LSPs in MPLS networks.

A sending LSR using LDP associates a Forwarding Equivalence Class (FEC) with each LSP it creates. The FEC associated with a particular LSP specifies which PDUs are associated with the particular LSP. LSPs are extended through a network as each LSR "splices" incoming labels for a given FEC to the outgoing label assigned to the next hop for the given FEC. In contrast, RSVP provides setup of resource reservations for multicast or unicast data flows initiated at a receiving LSR.

Routing schemes, as mentioned above, require information about links in the network through which data is to be routed. Traditionally, the information available regarding links in a network has related only to the link between a given pair of nodes. In an optical network, network topology information for this link may be said only to be available at the fiber granularity level. However, with the advent of DWDM, routing schemes exist (many based on MPLS) which employ network topology information available at the Lambda granularity level.

When designing a protocol for use in an optical label switching network, two issues arise. One issue relates to the effective representation of optical network resources (such as optical bandwidth) in a label, so as to provide a description of network topology information at various levels of granularity. Further, as an optical network may act as a transport network, a second issue relates to the representation of information regarding the interface between a service network and a transport network at the ingress to the transport network, so that the interface information may be confirmed at the egress of the transport network.

SUMMARY OF THE INVENTION

This present invention provides generic and flexible methods to represent optical bandwidth and service interfaces for optical label switching networks. Bandwidth may be represented simply at various granularity levels and in various combinations. Once a channel is defined at a given granularity level, the channel may be grouped into a channel group with other channels of the same granularity. Bandwidth vectors related to each channel group may then be defined to describe the availability of optical network resources for each channel.

Further, parameter format allowing for description of user-optical interface information is defined such that optical/IP inter-working may be supported. These representation formats could form a basis for a standard of optical domain and service domain interoperability.

In accordance with an aspect of the present invention there is provided a method of representing optical network bandwidth in a data communication network comprising a plurality of optical label switching routers and fiber optic links between said optical label switching routers. The method includes assigning an optical label to a channel group, said channel group using one of said fiber optic links and comprising a plurality of channels and encoding said optical label so as to comprise a type field, a length field and a value field, where said value field includes a label component and where said label component includes an indication of bandwidth on each of said plurality of channels. In another aspect of the present invention, there is provided an optical label switching router for carrying out this method. In a further aspect of the present invention, there is provided a software medium that permits a general purpose computer to carry out this method.

In accordance with another aspect of the present invention there is provided, in a data communication network comprising a plurality of optical label switching routers and fiber optic links between said optical label switching routers, a method of representing traffic characteristics of an interface between a node in a service network and one of said optical label switching routers. The method includes encoding a representation of said traffic characteristics of said interface so as to comprise a type field, a length field and a value field, where said value field includes an attribute. In another aspect of the present invention, there is provided an optical label switching router for carrying out this method. In a further aspect of the present invention, there is provided a software medium that permits a general purpose computer to carry out this method.

In accordance with a further aspect of the present invention there is provided, in a data communication network comprising a plurality of optical label switching routers and fiber optic links between said optical label switching routers, a method of representing characteristics of an optical trail. The method includes encoding a representation of said characteristics of said optical trail so as to comprise a type field, a length field and a value field, where said value field includes a channel group description, where said channel group description includes an indication of channel group type and an indication of a number of members in said channel group. In another aspect of the present invention, there is provided an optical label switching router for carrying out this method. In a further aspect of the present invention, there is provided a software medium that permits a general purpose computer to carry out this method.

In accordance with a further aspect of the present invention there is provided, in a data communication network comprising a plurality of optical label switching routers and fiber optic links between said optical label switching routers, a method of specifying session parameters for an optical communication session over one of said fiber optic links, where said one of said fiber optic links originates at an originating label switching router. The method includes encoding a specification of said session parameters so as to comprise a type field, a length field and a value field, where said value field includes a range component and said range component includes an identity of one of said fiber optic links, a lower bound of a block of wavelengths supported by said originating label switching router on said one of said fiber optic links and an upper bound of said block of wavelengths supported by said originating label switching router on said one of said fiber optic links. In another aspect of the present invention, there is provided an optical label switching router for carrying out this method. In a further aspect of the present invention, there is provided a software medium that permits a general purpose computer to carry out this method.

In accordance with a further aspect of the present invention there is provided, a data structure for use in communicating information regarding a plurality of channels from a first label switching router to a second label switching router including a type field, a length field, and a value field, where said value field includes a label component, and said label component includes an indication of bandwidth on each of said plurality of channels.

In accordance with a further aspect of the present invention there is provided, a data structure for use in communicating information regarding an interface between a node in a service network and a label switching router in a label switching network including a type field, a length field and a value field, where said value field comprises an attribute and where said attribute comprises an indication of a service type of said service network.

In accordance with a further aspect of the present invention there is provided, a data structure for use in communicating information regarding an interface between a node in a service network and a label switching router in a label switching network including a type field, a length field and a value field, where said value field comprises an attribute and where said attribute comprises an indication of a control protocol of said service network.

In accordance with a further aspect of the present invention there is provided, a data structure for use in communicating information regarding an optical label switching path from a first label switching router to a second label switching router including a type field, a length field and a value field, where said value field comprises a channel group description and where said channel group description comprises an indication of channel group type and an indication of a number of members in said channel group.

In accordance with a further aspect of the present invention there is provided, a data structure for use in communicating information regarding session parameters for an optical communication session over a fiber optic link from an originating label switching router to a receiving label switching router including a type field, a length field and a value field, where said value field includes a range component and said range component includes an identity of said fiber optic link, a lower bound of a block of wavelengths supported by said originating label switching router on said fiber optic link and an upper bound of said block of wavelengths supported by said originating label switching router on said fiber optic link.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 3 illustrates a generic Type-Length-Value (TLV) parameter for use in the generic Label Distribution Protocol message of FIG. 2;

FIG. 5 illustrates a Label Component of the Optical Label TLV of FIG. 4;

FIG. 6A illustrates a first Bandwidth Vector Mask for the Label Component of FIG. 5;

FIG. 6B illustrates a second Bandwidth Vector Mask for the Label Component of FIG. 5;

FIG. 8 illustrates an Optical Interface Type TLV for use in a signaling protocol in the transport network of FIG. 1 in accordance with the present invention;

FIG. 12 illustrates an Optical Label Range Component List TLV for use in a signaling protocol in the transport network of FIG. 1 in accordance with the present invention.

DETAILED DESCRIPTION OF THE PREFERRED EMBODIMENTS

Figure 1:
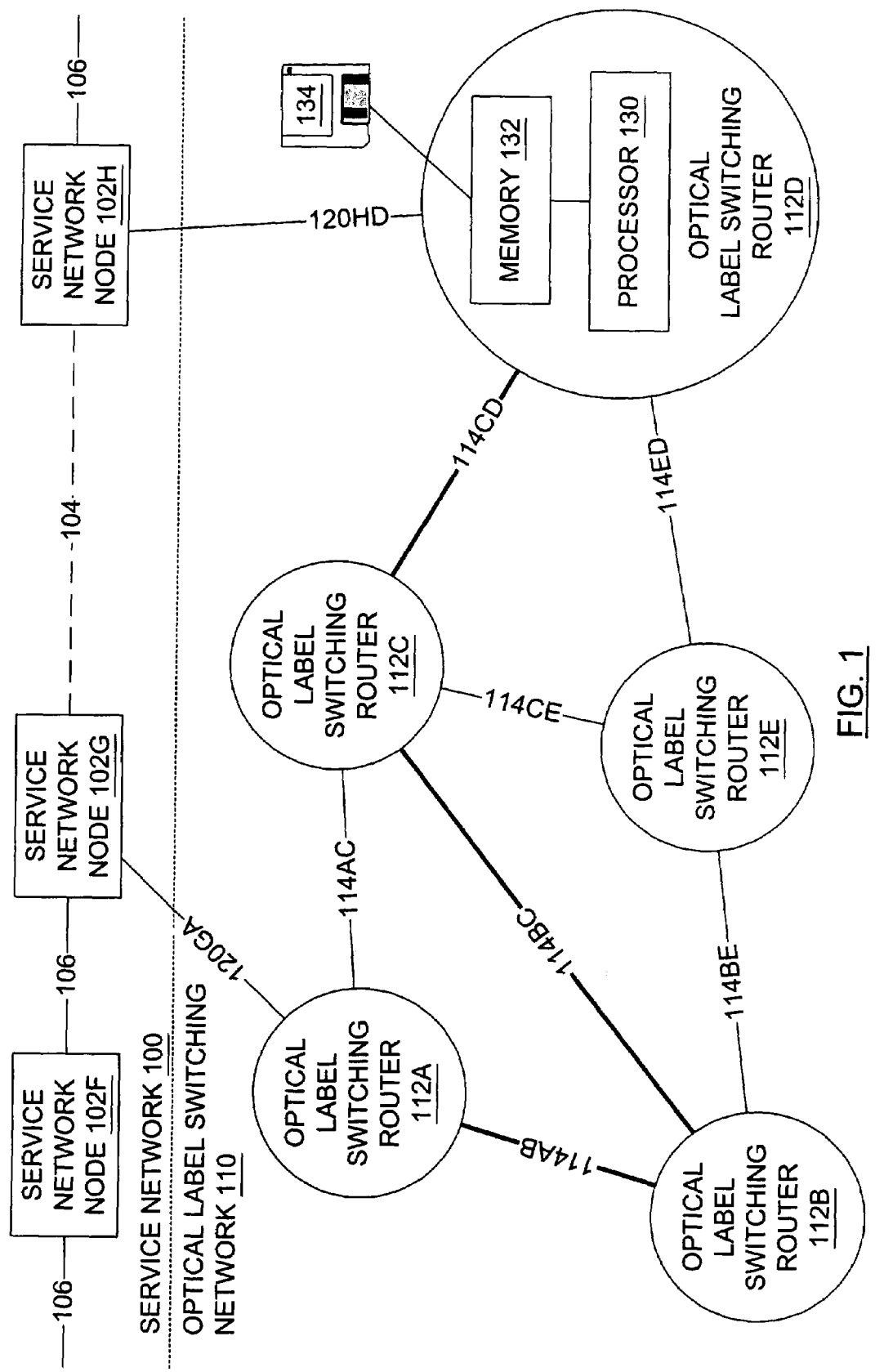
FIG. 1 illustrates a schematic representation of a transport network in relation to a service network.

FIG. 1 illustrates an exemplary network architecture suitable for use with the present invention. A transport network is exemplified by an optical label switching network 110, modeled as a graph of optical label switching routers (data transport nodes) 112A, 112B, 112C, 112D and 112E (referred to collectively or individually as 112) and links (referred to collectively or individually as 114) between the optical label switching routers 112. A service network 100 is shown to include a plurality of service network nodes 102F, 102G and 102H (referred to collectively or individually as 102) that may be connected by service links 106 within the service network, or virtual service links 104 that make use of the optical label switching network 110. While a local link 120GA connects a first service network node 102G to a first optical label switching router 112A, a remote link 120HD connects a second service network node 102H to a second optical label switching router 112D. The second optical label switching router 112D comprises a memory 132 and a processor 130 loaded with optical network bandwidth representation software for executing the method of this invention from a software medium 134. The software medium 134 could be a disk, a tape, a chip or a random access memory containing a file downloaded from a remote source.

There has been an increasing interest recently in agile optical networks. Agility in optical networks involves fast end-to-end optical path setup and restoration. One way to set up an optical path through an agile optical network quickly is to use signaling in conjunction with a dynamic routing scheme. The dynamic routing scheme is used to collect information on network topology and resources, pass states around and compute the optimal paths from one node to the others. Signaling is used to setup, maintain, modify and tear down these optimal paths.

Optical MPLS-enabled network 110 consists of Optical Label Switching Routers (OLSR) 112 and point-to-point links 114. The OLSRs are interconnected by links 114 in a mesh topology. There are two types of interfaces in this network: Optical Node-to-Node Interface (ONNI) between two OLSRs 112 and Optical User-Network Interface (OUNI) between a service network node 102 and OLSRs 112. A signaling protocol using parameters defined herein may serve as part of both ONNI and OUNI. An agile MPLS-enabled optical network is an optical network with fast Optical Label Switched Path (OLSP) setup and restoration. In this network, the control component of an OLSR consists of a routing protocol (OSPF or IS-IS, for example) and a signaling protocol (CR-LDP or RSVP-TE, for example). All control information can be exchanged through dedicated control channels or independent signaling networks.

There are two types of links, service-transparent (ST) links and service-aware (SA) links. An ST-link is a link providing transparent bit transmission, and the interfaces on both ends of this link simply perform bitwise input and output operation. An ST-Link can accept data at any bit rate below a certain maximum bit rate and any protocol format. A pure optical link in which the signal remains in optical form from the link input interface to the link output interface is an example of an ST-link. An SA-link is a link in which interfaces on both ends will handle the payload according to a given protocol format and/or data bit rate before transmitting and after receiving. An OC-192 link is an example of an SA-link.

In an MPLS-enabled optical network, an OLSP is an optical path between two OUNIs. An OLSP may consist of a fiber bundle, just a single fiber, the concatenation of multiple Lambdas, just one Lambda, groups of sub-Lambdas, or just one sub-Lambda (a sub-Lambda may be, for instance, one time slot in a frame of a TDM protocol). The label in an MPLS-enabled agile optical network may represent a mapping from ingress to egress of:

a fiber bundle;
an arbitrary number of fibers in a bundle;
a single fiber;
an arbitrary number of Lambdas within a fiber;
a single Lambda;
an arbitrary number of sub-Lambda channels; or
a single sub-Lambda channel.

In the proposal described in Awduche, et al, "Multi-Protocol Lambda Switching: Combining MPLS Traffic Engineering Control with Optical Crossconnects," draft-awduche-mpls-te-optical-01.txt, Work in progress, November 1999, a Lambda is the granularity of an OLSP. We believe that Lambda granularity is too coarse for a number of reasons. Bandwidth management and allocation is one issue. We may have, for example, an OC-48 encoded Lambda coming into an OLSR and an OC-192 encoded Lambda going out of the OLSR. If our allocation granularity is only at the Lambda level, the OC-48 must be mapped to an entire OC-192 pipe and, therefore, three quarters of the bandwidth is wasted. Scalability is another issue. Many routers are interconnected through an optical network, which require multiple optical paths among them. An "n squared" problem similar to that of classical IP over ATM may arise, as it is undesirable for traffic to cross the optical network twice when a direct optical path between the source and destination exists. We may quickly run out of Lambdas if these optical paths are Lambda paths, as opposed to sub-Lambda paths. The development of Lambda merging technology may alleviate this problem. However, this type of technology is not available yet. In the following, the granularity of an OLSP can be multiple fibers, a single fiber, multiple Lambdas, a single Lambda, different levels of sub-Lambdas, and groups at all fiber, Lambda and sub-Lambda levels.

Figure 2:
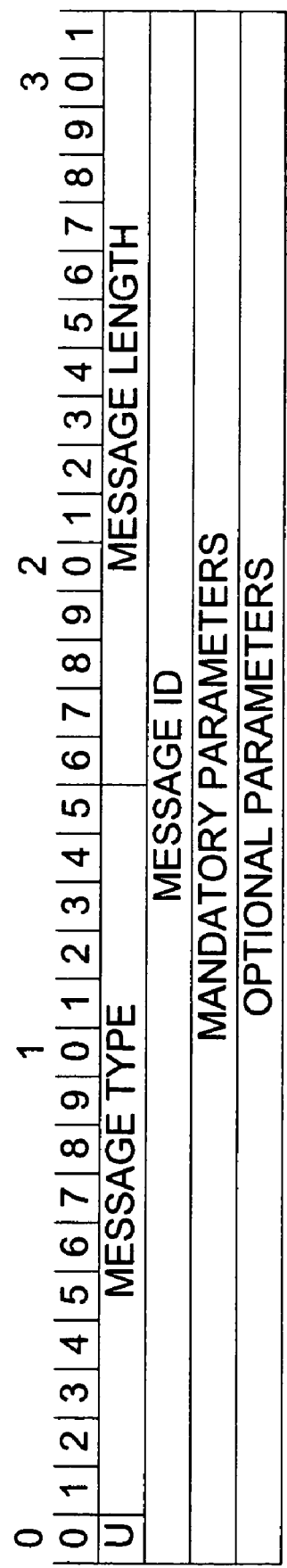
FIG. 2 illustrates a generic Label Distribution Protocol message.

In overview, through the use of the following proposed format, support is provided for OLSP setup, maintenance, and teardown in optical label switching networks by the introduction of new types of parameters and procedures related to CR-LDP/RSVP-TE. Optical bandwidth may be allocated and configured at each label switching router and, further, may be requested through the use of signaling messages. Information regarding optical bandwidth may also be propagated within a network to support dynamic routing. At the same time, service interface information may be carried over the network to support service-specific light paths. Notably, bandwidth may be represented simply at various granularity levels and in various combinations. An LDP protocol data unit may contain several unrelated LDP messages, all of which have a common structure, shown in FIG. 2, that uses a Type-Length-Value (TLV) encoding scheme. The Value part of a TLV-encoded parameter, or TLV for short, may itself contain one or more TLVs. In the first bit of the first row of an LDP message 200 is an "Unknown Message Bit" (the U bit). Upon receipt of a message whose type is unknown, if the U bit is clear i.e. equal to zero, a notification is returned to the message originator; if the U bit is set, i.e. equal to 1, the message of unknown type is silently ignored. The first row of the LDP message 200 also includes a "Message Type" and a "Message Length". Message Type is used to identify the type of message while Message Length is used to specify the cumulative length in octets of the rest of the message, which includes a "Message ID", a "Mandatory Parameters" field and an "Optional Parameters" field. Message ID is a 32-bit value used to identify the LDP message 200. Used by the sending LSR to facilitate the identification of notification messages that may apply to this message. An LSR sending a notification message in response to this message should include this Message Id in the notification message. The Mandatory Parameters field is a variable length set of required message parameters. Some messages have no required parameters. For messages that have required parameters, the required parameters must appear in the order specified by the individual message specifications. The Optional Parameters field is a variable length set of optional message parameters. Many messages have no optional parameters. For messages that have optional parameters, the optional parameters may appear in any order.

LDP uses a Type-Length-Value (TLV) encoding scheme to encode much of the information carried as parameters in LDP messages. A generic LDP message parameter 300 (FIG. 3) is encoded to include a two octet field that uses 14 bits to specify a Type and two bits to specify behavior when the Type is not recognized by a receiving LSR, followed by a two octet Length Field, followed by a variable length Value field. Of the behavior specifying bits, the U bit has been described, while the F bit is called a "Forward Unknown TLV bit". The F bit applies only when the U bit is set and the LDP message containing the unknown TLV is to be forwarded. If F is clear, i.e. equal to zero, the unknown TLV is not forwarded with the containing message; if F is set, i.e. equal to one, the unknown TLV is forwarded with the containing message.

Before defining new TLVs, it is useful to define that to which the new TLVs will relate, namely channel groups. The term channel group is used hereinafter to refer to a collection of channels where a channel may be a fiber, a Lambda, or a subdivision signal, carried by a Lambda, of a specific format. For example, a given Lambda, on a given fiber, may carry a signal with an OC-12 line rate. Channels of several different levels of granularity are available in this example, namely one fiber, one Lambda, one OC-12 signal, four OC-3 signals and 12 OC-1 signals. It is important that all members within a channel group have the same granularity. However, channel groups of different granularity may be mixed within a single TLV. Following are some exemplary Channel Group Types:

TABLE I

| Channel Group Type | Description |
| --- | --- |
| 1 | Fiber |
| 2 | Lambda |
| 3 | GE |
| 4 | 10 GE |
| 5 | OC-3/STM-1 |
| 6 | OC-3c |
| 7 | OC-12/STM-4 |
| 8 | OC-12c |
| 9 | OC-48/STM-16 |
| 10 | OC-48c |
| 11 | OC-192/STM-64 |
| 12 | OC-192c |
| 13 | OC-768/STM-256 |
| 14 | OC-768c |

In the above, GE is used to represent Gigabit Ethernet (see IEEE Standard 802.3). Further, the notation OC-3c is used to indicate that the particular optical carrier (in this case OC-3) has been concatenated to carry ATM and the notation STM-1 refers to a Synchronous Transport Module from ITU-T (Telecommunication Standardization Sector of the International Telecommunications Union) specifications for SONET at OC-3 rates.

Signaling protocols for explicitly routed LSPs, in conventional MPLS, use a label which is passed backwards from destination to source to construct the actual data-path. As each label is received for a particular output, a new label is allocated for the corresponding input. Thus the switching from ingress to egress is programmed. To accommodate the switching of entire fibers, Lambdas within those fibers and sub-Lambda signals, the concept of a composite label is introduced. This composite label allows a signaling protocol to establish entire fiber/Lambda and/or sub-Lambda paths using a single end-to-end Label Mapping message without having to run recursive instances of the signaling protocol. One important effect of a composite label is that the need to map a number of sub-Lambdas may result in the allocation of one or more new Lambdas, which may, in turn, result in the allocation of entire fibers.

In operation, responsive to a request from the service network node 102G for a connection to the remote service network node 102H, and based on network topology information received in messages from the other optical label switching routers 112, the first optical label switching router 112A may determine a path through the transport network 110 comprising links 114AB, 114BC and 114CD. The first optical label switching router 112A may then use a signaling protocol such as LDP, with bandwidth representation granularity enhancements provided herein, to set up an Optical Label Switched Path (OLSP) for a particular channel group.

The OLSP set up procedure involves the first optical label switching router 112A sending a Label Request message (identifying the channel group) to the second optical label switching router 112B at the end of the first hop in the determined path. The second optical label switching router 112B extracts from the Label Request message an indication of the determined path in the form of a Path Vector TLV and sends a Label Request message to the third optical label switching router 112C. The third optical label switching router 112C extracts from the Label Request message an indication of the determined path in the form of a Path Vector TLV and sends a Label Request message to the fourth optical label switching router 112D. At the fourth optical label switching router 112D, information included within the Label Request message describing the interface between the first optical label switching router 112A and the service network node 102G are checked against available interfaces to the remote service network node 102H.

In the event of a successful check, the fourth optical label switching router 112D uses the information included in the Label Request message to form a mapping of connections from the third optical label switching router 112C to connections to the remote service network node 102H. The fourth optical label switching router 112D subsequently sends a Label Mapping message to third optical label switching router 112C. Such a Label Mapping message includes a label associating the channel group with the specific connections to which each of the channels in the channel group have been allocated at the fourth optical label switching router 112D. Upon receipt of the Label Mapping message from the fourth optical label switching router 112D, the third optical label switching router 112C performs a mapping and sends a Label Mapping message to the second optical label switching router 112B. Upon receipt of the Label Mapping message from the third optical label switching router 112C, the second optical label switching router 112B performs a mapping and sends a Label Mapping message to the first optical label switching router 112A, where the set up of the optical label switched path is considered to be complete.

A composite label, in accordance with this invention, has a somewhat complex TLV format. As an aid to understanding composite labels, the following ASCII representation is introduced: {<Fiber>.<Lambda>.<Sub-Lambda>} or "F.L.S". Composite labels travel within a Label Mapping message and behave in a manner similar to other in-band labels. This means that a Label Mapping message can control the switching, in an OLSR, of an entire fiber on some input bundle to an entire fiber on some output bundle, an entire Lambda to a corresponding Lambda, or a sub-Lambda to sub-Lambda. For example, the receipt of a Label Mapping message with the label F7.L4.* may cause the generation of a mapping with the label F4.L62.*. The result would be that the fiber 4, Lambda 62 on the input port would be mapped completely to fiber 7 Lambda 4 on the output port. Many other mapping combinations exist and what is possible is dictated by what is supported by the switching hardware being traversed.

A Label Mapping message is defined in the LDP specification and may be used for setting up OLSPs with use of a herein defined Optical Label TLV as the Label TLV. The processing of an Optical Label TLV is similar to that of a non-optical label TLV. When an OLSR receives an Optical Label TLV from the Label Mapping message, the OLSR updates a Label Information Table with the new label and also configures a connection table based on the label. The Label Release, Label Withdraw and Label Abort messages are used as specified in the LDP specification to clear OLSPs. These messages may also carry the Optical Label TLV.

Figure 4:
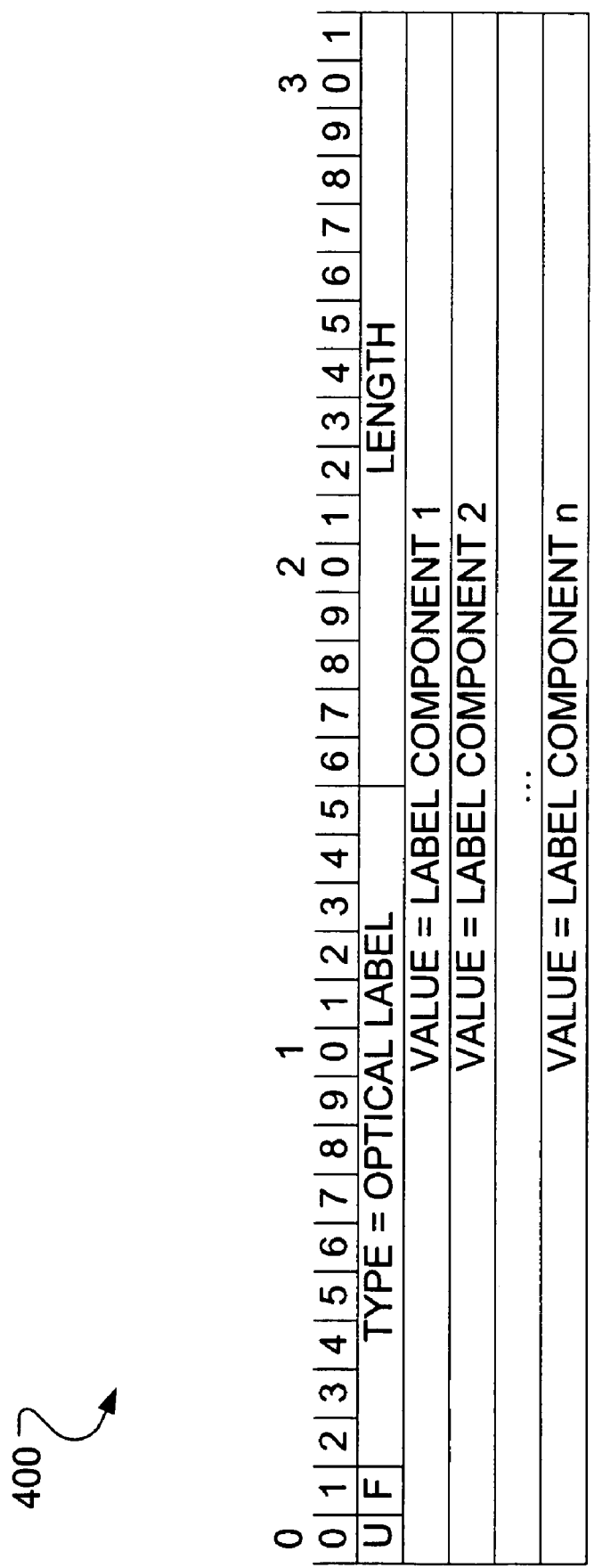
FIG. 4 illustrates an exemplary Optical Label TLV for use in a signaling protocol in the transport network of FIG. 1 in accordance with the present invention.

An Optical Label TLV (400, FIG. 4) may be used to encode optical labels. A simple composite optical label identifies an F.L.S. A multiple F.L.S can be used to compose an optical label representing one or more channel groups of different granularity. Optical Label TLVs are carried by the messages used to advertise, request, release and withdraw label mappings. Within the Optical Label TLV 400, the U bit and the F bit have been described, Length specifies the length of the Value field in bytes and the Value field contains Label Components that encode F.L.S for a channel group.

A Label Component 500 is illustrated in FIG. 5 and has a format that includes fields for a Channel Group Type, a Number of Group Members, a Line Rate Encoding Type, a Length and a Bandwidth Vector Mask. Each Label Component describes a single channel group. The Channel Group Type and the Number of Group Members have been defined above, while the Line Rate Encoding Type (LRET) specifies the top encoding protocol (e.g. OC-192). The possible type values for LRET are the same as Channel Group Type, with one additional type for transparent bit service, i.e. for the situation wherein the transport network ignores the channel group type. The transparent bit service type value is 0. The Length field holds an indication of the length of the field following this field in bytes (octets). The Bandwidth Vector Mask field is aligned with the 4-octet boundary and has a format that depends on the Channel Group Type.

To be "aligned with the 4-octet boundary" indicates that the Bandwidth Vector Mask field has a length in bits which is a multiple of 32. For example, if LRET is OC-192, which means total 192 STS-1 time slots, then the vector has 6×4-octet=192 bits. The length is 6. If LRET is OC-48, then the vector has 2×4-octet=64 bits, but with only first 48 bits to be used. This is so called "aligned with 4-octet boundary". If LRET is 10 Gigabit Ethernet, which supports multiplex 10 1-Giga Ethernet together, the vector has 1×4-octet=32 bits, with only the first 10 bits used.

Each Bandwidth Vector Mask (see FIG. 6A and FIG. 6B) includes fields for a Fiber ID and a Lambda ID. The Fiber ID field is a 16-bit field to specify a particular fiber. The Lambda ID field is a 16-bit field that identifies a Lambda. If the group type is fiber, all the Lambda IDs will be 0x0000. For Fiber and Lambda group types (see Bandwidth Vector Mask 600A in FIG. 6A), Fiber ID and Lambda ID are all that is required, however, for other groups (see Bandwidth Vector Mask 600B in FIG. 6B), a Channel ID field may be necessary to specify a sub-Lambda. The length and content of the Channel ID field depends on the channel group type.

Figure 7:
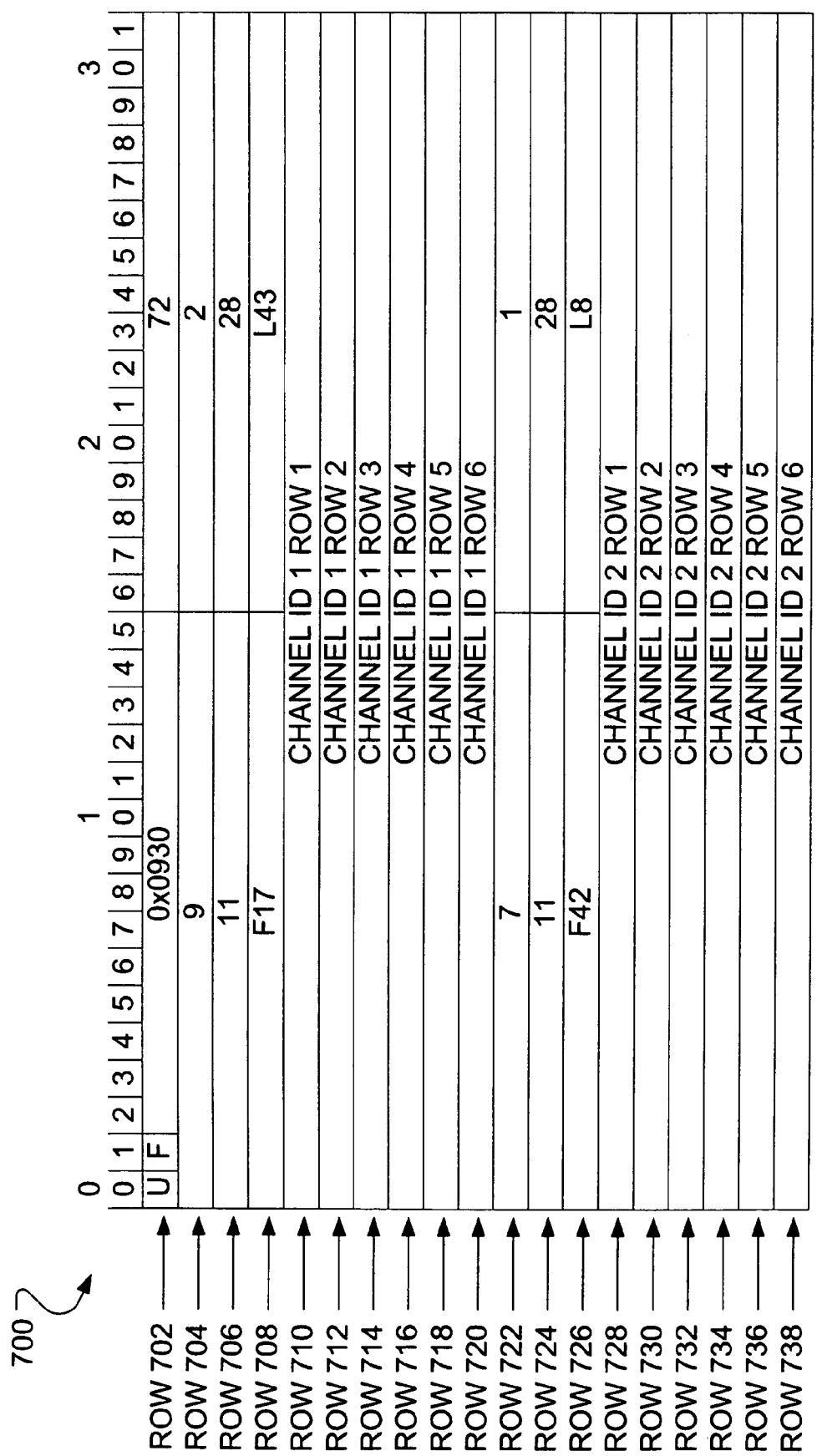
FIG. 7 illustrates an exemplary Optical Label TLV.

FIG. 7 illustrates an exemplary Optical Label TLV 700 for two sub-Lambda channel groups, where one channel group is an OC-48 group with two members and the other channel group is an OC-12 group with one member. In row 702, the TLV type is shown as 0x0930, which, by virtue of a naming convention, corresponds to an "Optical Label," and the length is given as 72 (18 rows×4 octets per row).

In the first field of the first row of the first label component (row 704), the Channel Group Type is given as "9," which corresponds (from Table I herein) to OC-48 and the Number of Group Members is given as "2". In row 706, the Line Rate Encoding Type is given as "11," which corresponds (from Table I) to OC-192 and the Length of the first Bandwidth Vector Mask (in rows 708, 710, 712, 714, 716, 718 and 720) is given as "28". Row 708 contains a Fiber ID, "F17," and a Lambda ID, "L43". The remaining rows of the first Bandwidth Vector Mask contain the Channel ID for the first channel group, a 192-bit long field (due to the OC-192 LRET) with 96 bits set (corresponding to the two OC-48 channel groups).

In the first field of the first row of the second label component (row 722), the Channel Group Type is given as "7", which corresponds to OC-12 and the Number of Group Members is given as "1". In row 724, the Line Rate Encoding Type is given as "11," which corresponds to OC-192 and the Length of the second Bandwidth Vector Mask (in rows 726, 728, 730, 732, 734, 736 and 738) is given as "28". Row 726 contains a Fiber ID, "F42," and a Lambda ID, "L8". The remaining rows of the second Bandwidth Vector Mask contain the Channel ID for the second channel group, a 192-bit long field (due to the OC-192 LRET) with only 12 bits set (corresponding to the one OC-12 channel group). Each bit in a Channel ID represents an STS-1 time slot and bit value of "0" represents an available STS-1 time slot.

A Label Request message is defined in the LDP specification and is used for setting up OLSPs. Specifically, an LSR sends a Label Request Message to an LDP peer to request a binding (mapping) for a FEC. When used in an optical switching network, a Label Request message must carry either an Optical Interface Type TLV or an Optical Trail Descriptor TLV, as defined hereinafter.

An LSR sends a Notification message to inform an LDP peer of a significant event. A Notification message is defined in the LDP specification and signals a fatal error or provides advisory information such as the outcome of processing an LDP message or the state of the LDP session. New status codes may be defined to signal errors associated with the establishment of an OLSP and the processing of Optical TLVs. When used in an optical switching network, a Notification message may carry an Optical Interface Type TLV or Optical Trail Descriptor TLV. When an optical interface type check or a compatibility check (described hereinafter) fails, the ingress OLSR may update its database by taking into account the actual optical interface type or the link attributes contained in the Optical Interface Type TLV or Optical Trail Descriptor TLV respectively.

An Optical Interface Type TLV 800 (FIG. 8) is used to represent the traffic characteristics of an interface between a node in a service network and an optical label switching router. Within the Optical Interface Type TLV the U bit and the F bit have been described. The F bit here is equal to one, such that an unknown TLV is always forwarded. Length specifies the length of the Value field in bytes and the Value field contains Link Attribute TLVs described hereinafter.

Figure 9:
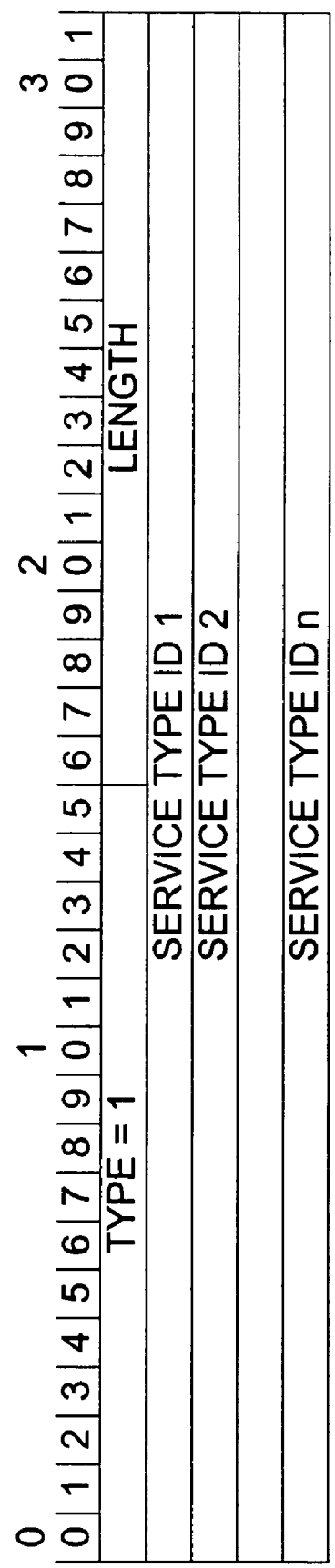
FIG. 9 illustrates a Service Type Mask TLV for use in the Optical Interface Type TLV of FIG. 8.

A first type of Link Attribute TLV is illustrated in FIG. 9 as a Service Type Mask TLV 900. The Service Type Mask TLV 900, like other TLVs, includes a Type field, indicating the Link Attribute TLV type, a Length field, indicating the length of the following (Value) field, and a Value field. The Value field includes a number of Service Type IDs, where each Service Type ID identifies the service type of each channel group on the OUNI of interest by a unique 32-bit number. For instance, the following Service Type ID values may be supported:

TABLE II

| Service Type ID | Description |
| --- | --- |
| 0 | IP |
| 1 | ATM |
| 2 | Frame Relay |
| 3 | SONET |

TABLE II-continued

| Service Type ID | Description |
| --- | --- |
| 4 | GE |
| 5 | FDDI |

In the above, FDDI is used to represent Fiber-Distributed Data Interface.

Figure 10:
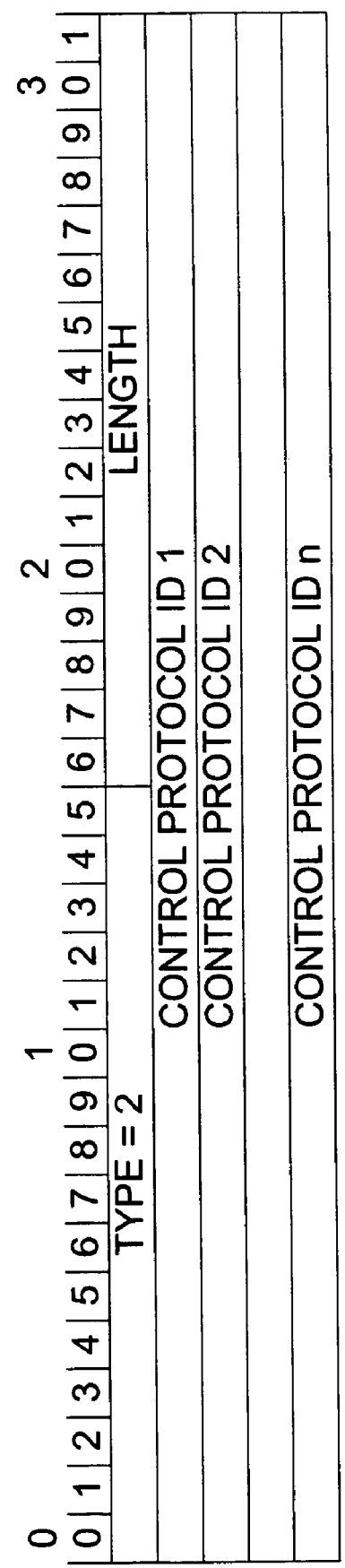
FIG. 10 illustrates a Control Protocol Mask TLV for use in the Optical Interface Type TLV of FIG. 8.

A second type of Link Attribute TLV, illustrated in FIG. 10, is a Control Protocol Mask TLV 1000. The Control Protocol Mask TLV 1000, like other TLVs, includes a Type field, indicating the Link Attribute TLV type, a Value field, and a Length field, indicating the length of the Value field. The Value field includes a number of Control Protocol IDs, where each Control Protocol ID identifies the control protocol of each channel group on the OUNI of interest by a unique 32-bit number. For instance, the following Control Protocol ID values may be supported:

TABLE III

| Control Protocol ID | Description |
| --- | --- |
| 0 | OSPF (Open Shortest Path First) |
| 1 | RIP (Routing Information Protocol) |
| 2 | BGP4 (Border Gateway Protocol 4) |
| 3 | EGP (Exterior Gateway Protocol) |
| 4 | MOSPF (Multicast OSPF) |
| 5 | DVMRP (Distance Vector Multicast Routing Protocol) |
| 6 | PIM (Protocol Independent Multicast) |
| 7 | IS-IS (Intermediate System-to-Intermediate System) |
| 8 | PNNI (Private Network-Network Interface) |

When an edge OLSR receives a Label Request message, the OLSR retrieves the Optical Interface Type TLV from the message and compares the value of every attribute with that of the requested user-network interface. If all the attributes match, the Optical Interface Type check is successful. Otherwise, the OLSR generates a Notification or PathErr message to indicate the mismatch.

Figure 11:
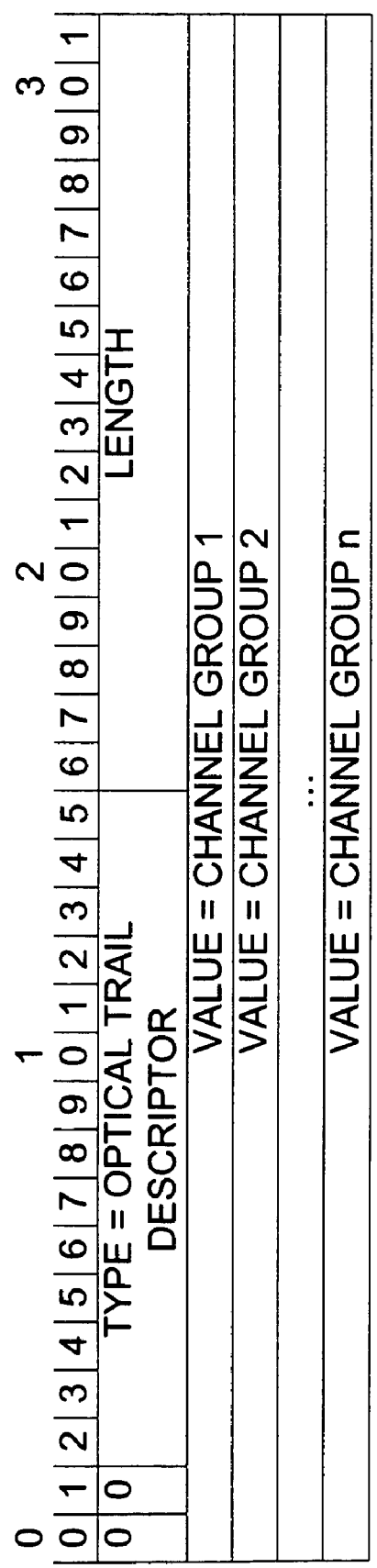
FIG. 11 illustrates an Optical Trail Descriptor TLV for use in a signaling protocol in the transport network of FIG. 1 in accordance with the present invention.

The Optical Trail Descriptor TLV represents the characteristics of an optical trail, where an optical trail is an end-to-end OLSP. The optical trail may consist of one or more channel groups of different granularity. All members within a group must have the same granularity, but different group types may be mixed into one Optical Trail Descriptor TLV. An Optical Trail Descriptor TLV 1100 is encoded as illustrated in FIG. 11. Each Channel Group field describes the components of an optical trail. The encoding of the 32-bit Channel Group includes 16-bits to represent the Channel Group Type, as defined above, and 16-bits to specify the Number of Group Members.

When an OLSR receives a Label Request message over an SA-link, the OLSR retrieves the Optical Trail Descriptor TLV from the message and assigns a label based on the Optical Trail Descriptor TLV. When a first OLSR sends a Label Request to a second OLSR over an SA-link, the first OLSR performs a compatibility check first. The Label Request message is sent if the compatibility check is successful. Otherwise, the first OLSR generates a Notification or PathErr message to indicate the compatibility check failure.

The compatibility check must be performed at each SA-link to make sure the link can support the certain type of optical trail as requested. A requested optical trail could be, for example, an OC-48 trail and may be built over an OC-192 link. The compatibility check will be successful if this link can support OC-48 multiplexing and an OC-48 channel is available. Otherwise, the compatibility check will fail.

An Initialization message is defined in the LDP specification and is exchanged during LDP peer session initialization to agree upon a common set of parameters to be used when setting up LSPs. When the Initialization message is used in Optical Label Switching Networks, an Optical Label Range Component List TLV is included in the optional TLV field of the Initialization message.

As illustrated in FIG. 12, an Optical Label Range Component List TLV 1200 is used to specify Optics-specific session parameters. Optical Label Range Component List TLV 1200 includes an M field, an N field and a number of Label Components. The M field is a three bit field that specifies the Multiplexing Capabilities of an OLSR. For instance, the following values may be supported:

TABLE IV

| Value | Meaning |
| --- | --- |
| 0 | Multiplexing not supported |
| 1 | SONET/SDH multiplexing supported |
| 2 | others (e.g., GE multiplexing supported) |

N is a four bit field that specifies a number of optical label range components to follow.

Figure 13:
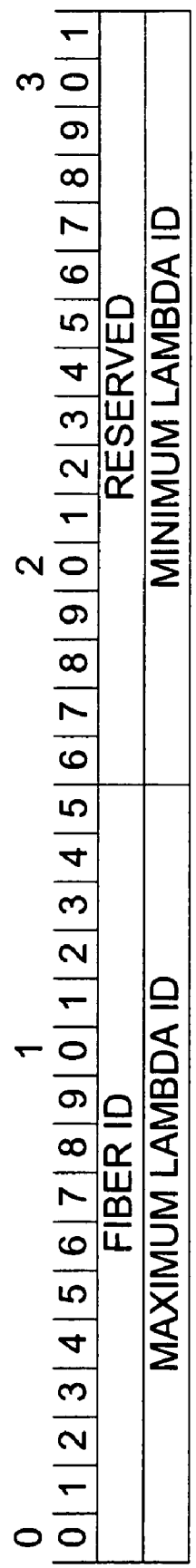
FIG. 13 illustrates an Optical Label Range Component for use in the Optical Label Range Component List TLV of FIG. 12.

Within an Optical Label Range Component 1300 (FIG. 13), there is a Fiber ID field, a Maximum Lambda ID field, identifying an upper bound for a block of Lambdas supported by the originator of the Initialization message, and a Minimum Lambda ID field, identifying a lower bound for the block of Lambdas. The Fiber ID field is a 16-bit field that identifies a specific fiber. The Maximum Lambda ID field is a 16-bit field that specifies the lower bound of a block of Lambdas that are supported by the originating OLSR. The Minimum Lambda ID field is a 16-bit field that specifies the lower bound of a block of Lambdas that are supported by the originating OLSR. Alternatively, Optical Label Range Component 1300 may include fields for Minimum Lambda Channel ID, Number of Lambda Channels and Spacing. A receiving OLSR must calculate the intersection between the received range and the range supported by the receiving OLSR. The intersection is the range in which the OLSR may allocate and accept labels. If the intersection of ranges is NULL, the OLSR sends a Notification message with the error code "Session Rejected/Parameters Label Range" in response to the Initialization message and not establish the session in CR-LDP case, or sends a PathErr message with the error code "Routing problem" and the error value "MPLS label allocation failure" in RSVP case.

In the Optical TLV processing described above, certain errors need to be reported as part of the Notification messages, PathErr Messages and other messages. The status codes for the errors described above are listed below. This list of codes is not exhaustive.

TABLE V

| Type of Error | Status Code |
| --- | --- |
| Optical Interface Type Mismatch | 0x05000001 |
| Compatibility Check Failure | 0x05000002 |
| Bad OIT TLV | 0x05000003 |
| Bad OTD TLV | 0x05000004 |

TABLE V-continued

| Type of Error | Status Code |
| --- | --- |
| Bad Optical Label TLV | 0x05000005 |
| NULL intersection | 0x05000007 |

Other modifications will be apparent to those skilled in the art and, therefore, the invention is defined in the claims.

We claim:

1. In a data communication network comprising a plurality of optical label switching routers and fiber optic links between said optical label switching routers, a method of representing optical network bandwidth, said method comprising:
  assigning an optical label to a channel group, said channel group using one of said fiber optic links and comprising a plurality of channels, said label representing an ingress to egress mapping;
  encoding said optical label so as to comprise a type field, a length field and a value field, where said value field comprises a label component and where said label component comprises an indication of whether each channel of said plurality of channels is available for use in a label switched path.

2. The method of claim 1 wherein said indication of whether each channel of said plurality of channels is available for use in a label switched path identifies said one of said fiber optic links and a wavelength on said one of said fiber optic links.

3. In a data communication network comprising a plurality of optical label switching routers and fiber optic links between said optical label switching routers, a method of representing optical network bandwidth, said method comprising:
  assigning an optical label to a channel group, said channel group using one of said fiber optic links and comprising a plurality of channels, said label representing an ingress to egress mapping;
  encoding said optical label so as to comprise a type field, a length field and a value field, where said value field comprises a label component and where said label component comprises an indication of currently available bandwidth on each of said plurality of channels;
  wherein said indication of currently available bandwidth identifies said one of said fiber optic links, a wavelength on said one of said fiber optic links and said channel group.

4. The method of claim 3 wherein current availability of bandwidth on each of said plurality of channels is represented by a single bit.

5. The method of claim 4 wherein a bit value of zero for said single bit indicates currently available bandwidth on a given one of said plurality of channels.

6. In a first data communication network comprising a plurality of optical label switching routers and fiber optic links between said optical label switching routers, said label representing an ingress to egress mapping, a method of representing traffic characteristics comprising:
  encoding a representation of traffic characteristics of an interface between one of said optical label switching routers in said first data communication network and a node in a second network so as to comprise a type field, a length field and a value field, where said value field comprises an attribute of said second network.

7. The method of claim 6 wherein said attribute comprises an indication of a service type of said second network.

8. The method of claim 6 wherein said attribute comprises an indication of a control protocol of said second network.

9. In a data communication network comprising a plurality of optical label switching routers and fiber optic links between said optical label switching routers, said label representing an ingress to egress mapping, a method of representing characteristics of an optical trail, said method comprising:
  encoding a representation of said characteristics of said optical trail so as to comprise a type field, a length field and a value field, where said value field comprises a channel group description; and
  where said channel group description comprises an indication of channel group type and an indication of a number of members in said channel group.

10. In a data communication network comprising a plurality of optical label switching routers and fiber optic links between said optical label switching routers, said label representing an ingress to egress mapping, a method of specifying session parameters for an optical communication session over one of said fiber optic links, where said one of said fiber optic links originates at an originating label switching router, said method comprising:
  encoding a specification of said session parameters so as to comprise a type field, a length field and a value field, where said value field comprises a range component; and
  said range component comprises:
    an identity of one of said fiber optic links;
    a lower bound of a block of wavelengths supported by said originating label switching router on said one of said fiber optic links; and
    an upper bound of said block of wavelengths supported by said originating label switching router on said one of said fiber optic links.

11. An optical label switching router comprising a computer readable medium storing computer executable instructions which when executed:
  assign an optical label to a channel group: said channel group using one of a plurality of fiber optic links and comprising a plurality of channels, said label representing an ingress to egress mapping;
  encode said optical label so as to comprise a type field, a length field and a value field, where said value field comprises a label component and where said label component comprises an indication of whether each channel of said plurality of channels is available for use in a label switched path.

12. An optical label switching router comprising a computer readable medium storing computer executable instructions which when executed:
  encode a representation of characteristics of an optical trail of a channel group so as to comprise a type field, a length field and a value field, where said value field comprises a description of said channel group; and
  where said description of said channel group comprises an indication of a type of said channel group and an indication of a number of members in said channel group; said label representing an ingress to egress mapping.

13. An optical label switching router operable to:
  encode a specification of session parameters for an optical communication session over a fiber optic link so as to comprise a type field, a length field and a value field, where said value field comprises a range component, said label representing an ingress to egress mapping;

where said range component comprises:

an identity said fiber optic link;

a lower bound of a block of wavelengths supported by said label switching router on said fiber optic link; and an upper bound of said block of wavelengths supported by said label switching router on said fiber optic link.

14. A computer readable medium for providing program control for an optical label switching router, said computer readable medium storing computer executable instructions which when executed cause said optical label switching router to assign an optical label to a channel group: said channel group using one of a plurality of fiber optic links and comprising a plurality of channels, said label representing an ingress to egress mapping;

encode said optical label so as to comprise a type field, a length field and a value field, where said value field comprises a label component and where said label component comprises an indication of whether each channel of said plurality of channels is available for use in a label switched path.

15. A computer readable medium for providing program control for an optical label switching router, said label representing an ingress to egress mapping, said computer readable medium storing computer executable instructions which when executed cause said optical label switching router to:

encode a representation of characteristics of an optical trail of a channel group so as to comprise a type field, a length field and a value field, where said value field comprises a description of said channel group; and where said description of said channel group comprises an indication of a type of said channel group and an indication of a number of members in said channel group.

16. A computer readable medium for providing program control for an optical label switching router, said label representing an ingress to egress mapping, said computer readable medium storing computer executable instructions which when executed cause said optical label switching router to:

encode a specification of session parameters for an optical communication session over a fiber optic link so as to comprise a type field, a length field and a value field, where said value field comprises a range component; and where said range component comprises:

an identity said fiber optic link;

a lower bound of a block of wavelengths supported by said label switching router on said fiber optic link; and an upper bound of said block of wavelengths supported by said label switching router on said fiber optic link.

* * * * *

UNITED STATES PATENT AND TRADEMARK OFFICE
CERTIFICATE OF CORRECTION

PATENT NO. : 7,158,515 B1  Page 1 of 1
APPLICATION NO. : 09/611447
DATED : January 2, 2007
INVENTOR(S) : Guo-Qiang Wang et al.

It is certified that error appears in the above-identified patent and that said Letters Patent is hereby corrected as shown below:

Column 16, line 41, Claim 11, delete "executed:" and insert therefor --...executed causes said router to:--;

Column 16, line 44, claim 11, insert --and-- after the word "mapping;";

Column 16, line 54, claim 12, delete "executed:" and insert therefor --...executed causes said router to:--;

Column 16, line 64, claim 13, delete "operable to:" and insert therefor --comprising a computer readable medium storing computer executable instructions which when executed causes said router to:--;

Signed and Sealed this

Fourteenth Day of August, 2007

JON W. DUDAS
*Director of the United States Patent and Trademark Office*